(Model.)
R. S. WRIGHT.
COMBINED SEED PLANTER AND FERTILIZER DISTRIBUTER.
No. 270,535. Patented Jan. 9, 1883.
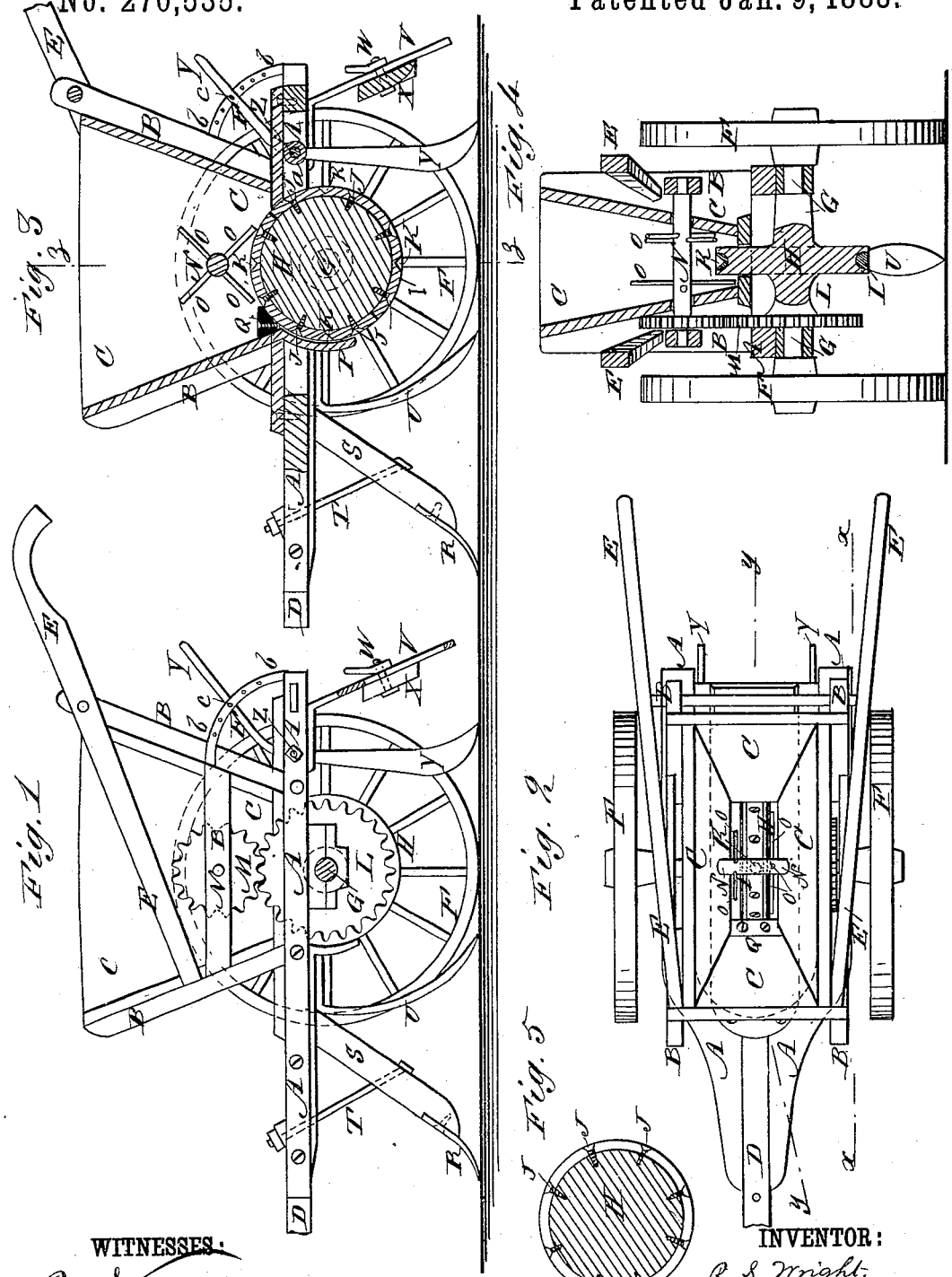
WITNESSES:
C. Neveux
B. G. Underwood.
INVENTOR:
R. S. Wright
BY Munn & Co
ATTORNEYS.

UNITED STATES PATENT OFFICE.

RICHARD S. WRIGHT, OF MONTICELLO, ARKANSAS.

COMBINED SEED-PLANTER AND FERTILIZER-DISTRIBUTER.

SPECIFICATION forming part of Letters Patent No. 270,535, dated January 9, 1883.

Application filed June 30, 1882. (Model.)

*To all whom it may concern:*

Be it known that I, RICHARD SLOAN WRIGHT, of Monticello, in the county of Drew and State of Arkansas, have invented a new and useful Improvement in Combined Seed-Planters and Fertilizer-Distributers, of which the following is a full, clear, and exact description.

Reference is to be had to the accompanying drawings, forming a part of this specification, in which similar letters of reference indicate corresponding parts in all the figures.

Figure 1 is a side elevation of my improvement, partly in section, through the line $x\,x$, Fig. 2. Fig. 2 is a plan view of the same. Fig. 3 is a sectional side elevation of the same, taken through the line $y\,y$, Fig. 2. Fig. 4 is a rear sectional elevation of the same, taken through the line $z\,z$, Fig. 3. Fig. 5 is a sectional side elevation of the distributing-wheel shown as arranged for planting cotton-seeds and distributing fertilizers.

The object of this invention is to facilitate the planting of seeds and the distributing of fertilizers, and also to promote convenience in adjusting the machine for the different kinds of work; and to this end the invention consists in the peculiar construction and arrangement of parts, as hereinafter fully set forth, and pointed out in the claims.

A represents the frame of the machine, to the middle part of which is secured the flaring frame B, that supports the hopper C. The ends of the bottom of the hopper project, and are secured to the end parts of the frame A.

To the forward end of the frame A is attached the draw-bar D, and to the frame B are attached the handles E, by means of which the machine is guided and controlled.

F are the wheels, one or both of which are rigidly attached to the axle G, so that the said axle will be revolved by the advance of the machine. The axle G revolves in bearings attached to the lower side of the middle part of the side bars of the frame A.

To the center of the axle G is attached the distributing-wheel H, in the face of which is formed a half-round groove, into which is fitted an annular bar, I, of half-round iron. The bar I is made in two parts, and is secured in place by screws J passing through it and into the wheel H. In the bar I are formed four recesses or cups, K, at equal distances apart, and each of such a size as to contain enough seed for a hill. With this construction four hills will be dropped at each revolution of the wheel F and at a distance apart equal to one-quarter of the circumference of the said wheels. By stopping up two of the recesses K the hills will be dropped at distances apart equal to half the circumference of the wheels F. By stopping up three of the recesses K the hills will be dropped at distances apart equal to the circumference of the wheels F.

When the machine is to be used for planting cotton-seeds and distributing fertilizers, the recessed bar I, of half-round iron, is removed, and the screws J are replaced to serve as teeth for withdrawing the cotton-seeds or the fertilizer from the hopper C, as shown in Fig. 5.

To the axle G, at one side of the hopper C, is attached a gear-wheel, L, the teeth of which mesh into the teeth of the gear-wheel M, attached to the shaft N. The shaft N passes through the sides of the hopper C, and its ends revolve in bearings formed in or attached to the side bars of the frame B. To the shaft N, within the hopper C and upon the opposite sides of its center, are attached radial arms O, which, as the machine is drawn forward, are revolved, and keep the cotton-seed or fertilizer stirred up, so that it will readily pass to the wheel H and be carried out by the screws or teeth J.

To the bottom of the hopper C, at the forward side of the distributing-wheel H, is attached the upper end of an iron plate, P, which is curved to serve as a cut-off to prevent the wheel H from carrying out any more seed than enough to fill the recesses K, and as a guard to keep the seed within the said recesses until it has been carried down to such a point that it can drop directly to the ground.

To the bottom of the hopper C and at the top of the guard-plate P is attached a rubber block, Q, which rests against the face of the wheel H and prevents the seed from being injured by being forced against the edge of the iron plate P. A furrow is opened to receive the seed by a plow, R, attached to the lower end of the standard S, the upper end of which is secured to the frame A or to the draw-bar D. The standard S is supported against the draft-strain by a brace-rod, T, the lower end of which is secured to the lower part of the said standard S, and its upper end is secured to the draw-bar D.

To the draw-bar D or to the frame A is attached the upper end of a bar, U, which is curved to the rearward, and is made of such a length that its lower end will be drawn along the furrow opened by the plow R. The lower end of the bar U is made spoon-shaped, so that it will pack the sides of the furrow, and prevent the soil from falling in and partially filling the said furrow before the seed has been deposited in the said furrow.

To the rear corners of the frame B are attached the upper ends of two bars, V, which incline to the rearward and extend nearly to the ground. The bars V are slotted to receive the bolts W, by means of which the ends of the covering-block X are secured to the said bars V, so that the covering-block X can be raised and lowered as the character of the work to be done may require. The lower edge of the covering-block X is concaved in the ordinary manner to give the desired form to the top of the ridge or row. When the machine is to be used as a fertilizer-distributer the covering-block X and the bars V are detached.

To the inner sides of the bars of the frame A, a little in front of the bars V, are pivoted two plows, Y, by a bolt or rod, Z, passing through the said side bars and plows. The plows Y are designed to work in the ground at the opposite sides of the seed-receiving furrow, so as to fill the said furrow with soil, and thus cover the seed, the top of the row being smoothed off and evened by the covering-block X. The plows Y are kept in place against the inner sides of the side bars of the frame A by a tubular washer, a, placed between them upon the rod Z. The upper parts of the plows Y project above the frame A, incline to the rearward, and cross the curved bars b, the lower ends of which are attached to the rear ends of the side bars of the frame A, and their upper ends are attached to the rear bars of the frame B.

In the bars b are formed a number of holes to receive the pins c, by which the plows Y are held against the draft-strain, so that the plows can be adjusted to work at any depth in the ground by adjusting the said pins c.

Having thus described my invention, I claim as new and desire to secure by Letters Patent—

1. In a combined seed-planter and fertilizer-distributer, the combination, with the annular grooved dropping-wheel H, of the annular bar I, adapted to fit in the groove of the wheel, and provided with recesses K, and the screws J for securing the said bar in the groove, substantially as shown and described, whereby the screws are made to serve the double purpose of means of fastening and teeth when the annular bar is removed, as set forth.

2. In a combined seed-planter and fertilizer-distributer, the combination, with the frame A and the rod Z, of the pivoted plows Y, having their standards extended above the said frame and projecting to the rearward, the tubular washer a, the curved and perforated bar b, and the pins c, substantially as and for the purpose set forth.

3. In a combined seed-planter and fertilizer-distributer, the combination, with the frame A, of the opener R S, the curved bar U, having spoon-shaped lower end, the plows Y, and the adjustable covering-blocks X, substantially as and for the purpose set forth.

RICHARD SLOAN WRIGHT.

Witnesses:
W. S. PICKENS,
Z. T. WOOD.